3,426,130
COMPOSITIONS CONTAINING A BENZOTHIADI-
AZINESULFONAMIDE 1,1-DIOXIDE
Charles Riffkin, Highland Park, and Martin Goldberg,
New Brunswick, N.J., assignors, by mesne assignments,
to E. R. Squibb & Sons, Inc., New York, N.Y., a corporation of Delaware
No Drawing. Filed Dec. 19, 1960, Ser. No. 76,464
U.S. Cl. 424—246                                    7 Claims
Int. Cl. A61k 27/00

This invention relates to compositions containing a benzothiadiazinesulfonamide 1,1-dioxide which may be administered parenterally.

Benzothiadiazinesulfonamide 1,1-dioxides are widely used as natriuretic and diuretic agents. They are particularly effective in the treatment of congestive heart failure by virtue of their ability to relieve excessive water retention and to restore and maintain proper electrolyte balance. The compounds are also useful in the treatment of hypertension conditions.

Benzothiadiazinesulfonamide 1,1-dioxides alone are in general insoluble in water. The preparation of satisfactory parenterally administrable formulations of compounds having a benzothiadiazine-1,1-dioxide nucleus has been accomplished heretofore only with difficulty.

A widely used method for producing parenterally administrable dosage forms involves the preparation of a strongly alkaline solution of the compound, e.g. a 0.1 molar sodium hydroxide solution, sterilizing that solution, rapidly freezing the solution before extensive degradation or hydrolysis takes place and subliming off the water in vacuo, i.e. by lyophilization. This procedure provides a relatively dry, sterile product which may be reconstituted with water for injection or 5% dextrose or saline and which demonstrates reasonable stability.

Such a procedure, however, introduces two distinct disadvantages. A particular disadvantage is the high degree of alkalinity required to dissolve the benzothiadiazinesulfonamide 1,1-dioxide. The pH of the solution is inordinately high and results in pain and irritation at the site of injection. In addition, the process of preparing the formulation is both cumbersome and costly. Lyophilization, in particular, requires sizable equipment which is both expensive to install and to operate.

It has now been found that compositions for parenteral administration containing a benzothiadiazinesulfonamide 1,1-dioxide as a principal active ingredient may be formulated by simple procedures which avoid the need for lyophilization and which provide stable products, non-irritating in use.

It is an object of this invention to provide stable, parenterally administrable compositions with an improved tolerance level containing a benzothiadiazinesulfonamide 1,1-dioxide. The term "parenterally administrable" comprehends solutions as well as preparations requiring reconstitution with an aqueous medium for parenteral administration.

According to this invention a benzothiadiazinesulfonamide 1,1-dioxide compound merely is blended with a moderately alkaline substance and no lyophilization procedure is required. When the benzothiadiazinesulfonamide 1,1-dioxide and the moderately alkaline substance are brought into solution, a non-irritating, parenterally administrable product is obtained. The dry blend of benzothiadiazinesulfonamide 1,1-dioxide and moderately alkaline substance can be stored in closed sterile containers for later reconstitution prior to use. It is not necessary, when preparing a dry product for later use, to first dissolve the benzothiadiazinesulfonamide 1,1-dioxide in alkaline solution and then subject the solution to a costly drying operation such as lyophilization in order to obtain a stable, dry material.

In order to achieve the objects of this invention, the benzothiadiazinesulfonamide 1,1-dioxide compound is admixed with the moderately alkaline material in the dry state under sterile conditions to yield a dry blend which is then prepared for use by dissolving in sterile water, saline or dextrose.

The moderately alkaline substances which are blended with the benzothiadiazinesulfonamide 1,1-dioxide are water soluble, physiologically acceptable materials capable of effecting the solution of the medicament. For best results they should produce a pH of about 8 to 10.5 in aqueous solution with the benzothiadiazinesulfonamide 1,1-dioxide. This class includes such compounds as alkali metal carbonates and bicarbonates, e.g., sodium carbonate, potassium carbonate, sodium bicarbonate, alkali metal phosphates, e.g., sodium phosphate, potassium phosphate, basic alkylamines or alicyclic amines, e.g. N-methylglucamine, tris(hydroxymethyl) aminomethane, decylamine, t-octylamine, piperazine and the like.

Compounds having the benzothiadiazine 1,1-dioxide nucleus to which this invention is applicable include compounds of the general formula

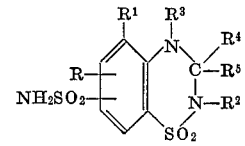

wherein the 3,4-position is double bonded or saturated, R is hydrogen, halogen, trihalomethyl, lower alkyl, lower alkoxy, nitro or amino, $R^1$ is hydrogen, halogen or lower alkyl, $R^2$ is hydrogen or lower alkyl, $R^3$ is hydrogen or lower alkyl, $R^4$ is hydrogen, lower alkyl, halo-lower alkyl, dihalo-lower alkyl, mononuclear aralkyl, mononuclear aralkyl-mercaptoalkyl, and mononuclear arylmercaptoalkyl, and $R^5$ is hydrogen or lower alkyl. Methyl, ethyl, propyl, isopropyl, butyl, etc., are illustrative of the lower alkyl groups; methoxy, ethoxy, propoxy, isopropoxy and the like are illustrative of the lower alkoxy groups; benzyl, phenethyl, α-methylphenethyl, and the like are illustrative of the mononuclear aralkyl groups; and phenyl, halophenyl, and lower alkylphenyl are illustrative of the aryl groups. Any of the four halogens may be present in the halogenated radicals.

Examples of such benzothiadiazinesulfonamide-1,1-dioxides are 6-trifluoromethyl-7-sulfamyl-1,2,4-benzothiadiazine-1,1-dioxide,
5-trifluoromethyl-7-sulfamyl-1,2,4-benzothiadiazine-1,1-dioxide,
7-trifluoromethyl-5-sulfamyl-1,2,4-benzothiadiazine-1,1-dioxide,
6-trifluoromethyl-7-sulfamyl-3,4-dihydro-1,2,4-benzothiadiazine-1,1-dioxide,
6-trifluoromethyl-3-benzyl-7-sulfamyl-3,4-dihydro-1,2,4-benzothiadiazine-1,1-dioxide,
6-chloro-7-sulfamyl-1,2,4-benzothiadiazine-1,1-dioxide,
6-chloro-7-sulfamyl-3,4-dihydro-1,2,4-benzothiadiazine-1,1-dioxide,
6-chloro-3-benzyl-7-sulfamyl-3,4-dihydro-1,2,4-benzothiadiazine-1,1-dioxide,
6-chloro-3-dichloromethyl-7-sulfamyl-3,4-dihydro-1,2,4-benzothiadiazine-1,1-dioxide,
6-chloro-3-benzylmercaptomethyl-7-sulfamyl-1,2,4-benzothiadiazine-1,1-dioxide,
6-chloro-3-benzylmercaptomethyl-7-sulfamyl-3,4-dihydro-1,2,4-benzothiadiazine-1,1-dioxide,
6-trifluoromethyl-3-benzyl-mercaptomethyl-7-sulfamyl-3,4-dihydro-1,2,4-benzothiadiazine-1,1-dioxide, and
6-chloro-3-phenylmercaptomethyl-7-sulfamyl-3,4-dihydro-1,2,4-benzothiadiazine-1,1-dioxide.

In order to prepare the dry composition of this invention, the benzothiadiazinesulfonamide-1,1-dioxide in the dry form and the alkaline substance are separately sterilized by dry heat, aseptic recrystallization or by gas sterilization, e.g., by means of ethylene oxide and carbon dioxide, then thoroughly blended under sterile conditions. In general the benzothiadiazinesulfonamide-1,1-dioxide is present in the final composition in a proportion of about 2 to 40% by weight. About 35–85% of the blend is alkaline substance.

Satisfactory results have been obtained when 25 to 75 parts of 6-trifluoromethyl-7-sulfamyl-3,4-dihydro-1,2,4-benzothiadiazinesulfonamide-1,1-dioxide are combined with from 200 to 300 parts of N-methylglucamine.

It is frequently desirable to extend or dilute the solid powder phase with another dry substance or substances which will aid, or at least not hinder, the solution of the benzothiadiazinesulfonamide 1,1-dioxide and at the same time will help achieve iso-tonicity and decrease irritation. This is accomplished by the use of such inert physiologically acceptable materials as sugars like dextrose, lactose, levulose, etc. polyhydroxy alcohols like sorbitol, mannitol, etc., salts like calcium lactate etc. The proportion of the extender is 0–60% by weight. The extender is similarly sterilized and then blended with the benzothiadiazinesulfonamide 1,1-dioxide and alkaline material. The alkaline material may also serve as extender if the excess does not inordinately raise the pH.

Preferable results are obtained when about 1 to 10 parts of 6-trifluoromethyl-3-benzyl-7-sulfamyl-3,4-dihydro-1,2,4-benzothiadiazine-1,1-dioxide, about 30 to 50 parts of mannitol and about 20 to 40 parts of potassium carbonate are combined.

The dry blended formulation is preferably maintained or stored in that form in closed sterile containers such as vials, ampules and the like until sometime shortly before use. The dry preparation is then reconstituted with an amount of sterile water, saline, 5% dextrose, or similar vehicle for injection in proper proportions to produce the required dosage which normally falls within the range of about 1 to 500 mg. depending upon the potency of the particular benzothiadiazinesulfonamide 1,1-dioxide compound used. The usual single dose of injectable is about 1 to 3 cc.

The aqueous solution form of the compounds of this invention, and the dry compositions utilizable in our preparation can, if desired, contain various auxiliary substances, such as sodium chloride or other salts to render the solutions isotonic or be diluted to isotonic concentrations. In addition, other active medicaments may be included.

The benzothiadiazinesulfonamide 1,1-dioxides are readily prepared by heating an appropriately substituted disulfamylaniline with formic acid or a functional reactive derivative thereof, for example, an aldehyde, acetal, ketone or ketal. Thus, by way of illustration, 5-trifluoromethyl-2,4-disulfamylaniline can be reacted with formic acid, formaldehyde or phenyl acetaldehyde, to produce, respectively, 6-trifluoromethyl-7-sulfamyl-1,2,4-benzothiadiazine-1,1-dioxide, 6-trifluoromethyl-7-sulfamyl-3,4-dihydro-1,2,4-benzothiadiazine-1,1-dioxide and 6-trifluoromethyl-3-benzyl-7-sulfamyl-3,4-dihydro-1,2,4-benzothiadiazine-1,1-dioxide.

The following examples are illustrative of the invention:

Example 1

50.0 g. of 6-trifluoromethyl-3-benzyl-7-sulfamyl-3,4-dihydro-1,2,4-benzothiadiazine-1,1-dioxide are dissolved in 500 cc. of alcohol. The solution is aseptically filtered and an equal volume of sterile water is added. The solution is allowed to crystallize in the refrigerator. The sterile crystals are filtered off and dried.

400.0 g. of mannitol are dissolved in 500 cc. of hot water for injection, precipitated with an equal volume of alcohol and dried.

300.0 g. of potassium carbonate are sterilized by dry heat.

The 6-trifluoromethyl-3-benzyl-7-sulfamyl-3,4-dihydro-1,2,4-benzothiadiazine-1,1-dioxide, mannitol and potassium carbonate are aseptically blended. The dry blend is then subdivided into vials each containing 75 mg. (5 mg. of benzothiadiazine compound) and the vials are closed and sealed.

The composition is reconstituted for parenteral administration by the addition of 1 cc. of water for injection to the vial and agitating until the solids are completely dissolved. The resulting solution may be administered intravenously or intramuscularly with minimal pain or irritation.

Example 2

50.0 g. of 6-trifluoromethyl-7-sulfamyl-3,4-dihydro-1,2,4-benzothiadiazine 1,1-dioxide are dissolved in 500 cc. of 40% aqueous dioxane. The solution is aseptically filtered and allowed to crystallize in the refrigerator. The sterile crystals are filtered off and dried.

250.0 g. of N-methylglucamine are dissolved in 250 cc. of hot water for injection, aseptically filtered and an equal volume of sterile alcohol is added. After cooling, the sterile crystals are collected and dried aseptically.

Both components are aseptically blended and subdivided into sterile vials each containing 300 mg. of sterile powder (50 mg. of benzothiadiazine compound). The vials are closed and sealed.

Upon reconstitution of the contents of a vial with 2 cc. of sterile water for injection, a solution is obtained which may be injected parenterally with minimum irritation.

Example 3

50.0 g. of 6-chloro-7-sulfamyl-3,4-dihydro-1,2,4-benzothiadiazine 1,1-dioxide are aseptically recrystallized from aqueous alcohol as described in Example 1. 300.0 g. of potassium carbonate are sterilized by dry heat. The two sterile compounds are then blended, subdivided into vials each containing 35 mg. and reconstituted in the same manner as described in Example 1.

Example 4

50.0 g. of 6-chloro-7-sulfamyl-3,4-dihydro-1,2,4-benzothiadiazine-1,1-dioxide are aseptically recrystallized from aqueous alcohol as described in Example 1. 250.0 g. of N-methylglucamine are sterilized by filtration from an aqueous solution as described in Example 2. The sterile material is then blended, subdivided into vials each containing 30 mg. and reconstituted in the same manner as in Example 2.

Example 5

50.0 g. of 6-trifluoromethyl-7-sulfamyl-1,2,4-benzothiadiazine 1,1-dioxide are aseptically recrystallized from aqueous alcohol as described in Example 1. 150.0 g. of potassium phosphate are sterilized by dry heat. The dry sterile compounds are blended, subdivided into vials each containing 20 mg. and reconstituted in the same manner as described in Example 1.

Example 6

50.0 g. of 6-chloro-7-sulfamyl 1,2,4-benzothiadiazine 1,1-dioxide are recrystallized as described in Example 1. 150.0 g. of N-methyl glucamine are sterilized by filtration from 150 cc. of aqueous solution. The sterile aqueous solution of N-methylglucamine is then aseptically precipitated by the addition of 150 cc. of sterile alcohol and the sterile solid is collected and dried. The dry substances are then blended, subdivided into vials each containing 20 mg. and reconstituted in the same manner as described in Example 2.

Example 7

50.0 g. of 6-trifluoromethyl-7-sulfamyl-3,4-dihydro-1,2,4-benzothiadiazine 1,1-dioxide are recrystallized by the procedure described in Example 1. 125.0 g. of N- methylglucamine are treated as described in Example 6. 75.0 g. of sodium bicarbonate are sterilized by dry heat. The three compounds are aseptically blended, subdivided into vials each containing 25 mg. and reconstituted in the same manner as described in Example 2.

Example 8

50.0 g. of 6-chloro-7-sulfamyl-1,2,4-benzothiadiazine 1,1-dioxide are aseptically recrystallized from aqueous alcohol in the same manner as in Example 1. 150.0 g. of potassium carbonate are sterilized by dry heat. The two sterile compounds are then aseptically blended until a homogeneous mixture is obtained. The blend is then aseptically filled into sterile vials each containing 20 mg. Each vial is reconstituted for use by the addition of 1 cc. of sterile water for injection and dissolving the solid material in the water.

Example 9

50.0 g. of 6-trifluoromethyl-3-benzyl-7-sulfamyl-3,4-dihydro-1,2,4-benzothiadiazine 1,1-dioxide are recrystallized as in Example 1. 300.0 g. of tris(hydroxymethyl)aminomethane are recrystallized from alcohol and dried. 500.0 g. of sorbitol are recrystallized from water and dried. The three compounds are then aseptically blended into a homogeneous mixture. The blend is subdivided and filled into vials each containing 85 mg. The vials are reconstituted for parenteral administration by dissolving in 2 cc. of water for injection.

What is claimed is:

1. A composition suitable for parenteral administration upon the addition of a non-toxic pharmaceutically acceptable vehicle consisting essentially of an intimate admixture of (I) dry, non-lyophilized, stable, sterile benzothiadiazinesulfonamide-1,1-dioxide selected from the group consisting of 6-trifluoromethyl-7-sulfamyl-1,2,4-benzothiadiazine 1,1-dioxide, 5-trifluoromethyl-7-sulfamyl-1,2,4-benzothiadiazine 1,1-dioxide, 7-trifluoromethyl-5-sulfamyl-1,2,4-benzothiadiazine 1,1-dioxide, 6-trifluoromethyl-7-sulfamyl-3,4-dihydro-1,2,4-benzothiadiazine 1,1-dioxide, 6-trifluoromethyl-3-benzoyl-7-sulfamyl-3,4-dihydro-1,2,4-benzothiadiazine 1,1-dioxide, 6-chloro-7-sulfamyl-1,2,4-benzothiadiazine 1,1-dioxide, 6-chloro-7-sulfamyl-3,4-dihydro-1,2,4-benzothiadiazine 1,1-dioxide, 6-chloro-3-benzyl-7-sulfamyl-3,4-dihydro-1,2,4-benzothiadiazine 1,1-dioxide, 6-chloro-3-dichloromethyl-7-sulfamyl-3,4-dihydro-1,2,4-benzothiadiazine-1,1-dioxide, 6-chloro-3-benzoylmercaptomethyl-7-sulfamyl-1,2,4-benzothiadiazine 1,1-dioxide, 6-chloro-3-benzyl-mercaptomethyl-7-sulfamyl-3,4-dihydro-1,2,4-benzothiadiazine 1,1-dioxide, 6-trifluoromethyl-3-benzylmercaptomethyl-7-sulfamyl-3,4-dihydro-1,2,4-benzothiadiazine 1,1-dioxide, and 6-chloro-3-phenylmercaptomethyl-7-sulfamyl-3,4-dihydro-1,2,4-benzothiadiazine 1,1-dioxide; and (II) a substantially dry, water soluble, physiologically acceptable, moderately alkaline substance of the group consisting of alkali metal carbonates, bicarbonates and phosphates, and basic alkylamines and acyclic amines said moderately alkaline substance being present in sufficient amount to produce a pH of about 8.0 to 10.5 in aqueous solution with the benzothiadiazinesulfonamide 1,1-dioxide.

2. A composition suitable for parenteral administration upon the addition of a non-toxic, pharmaceutically acceptable vehicle comprised essentially of an intimate admixture of (I) dry, non-lyophilized, stable, sterile 6-trifluoromethyl-3-benzyl-7-sulfamyl-3,4-dihydro-1,2,4-benzothiadiazine 1,1-dioxide and (II) a substantially dry, physiologically acceptable, moderately alkaline substance of the group consisting of alkali metal carbonates, bicarbonates and phosphates, and basic alkylamines and acyclicamines said moderately alkaline substance being present in sufficient amount to produce a pH of about 8.0 to 10.5 in aqueous solution with the 6-trifluoromethyl-3-benzyl-7-sulfamyl-3,4-dihydro-1,2,4-benzothiadiazine-1,1-dioxide.

3. A composition as in claim 2, wherein the alkaline substance is potassium carbonate.

4. A composition suitable for parenteral administration upon the addition of a non-toxic, pharmaceutically acceptable vehicle comprised essentially of an intimate admixture of (I) dry, non-lyophilized, stable, sterile 6-trifluoromethyl-7-sulfamyl-3,4-dihydro 1,2,4-benzothiadiazine 1,1-dioxide and (II) a substantially dry, water soluble, physiologically acceptable moderately alkaline substance selected from the group consisting of alkali metal carbonates, bicarbonates and phosphates, and basic alkylamines and acyclicamines said moderately alkaline substance being present in sufficient amount to produce a pH of about 8.0 to 10.5 in aqueous solution with the 6-trifluoromethyl-7-sulfamyl-3,4-dihydro-1,2,4-benzothiadiazine-1,1-dioxide.

5. A composition suitable for parenteral administration upon the addition of a non-toxic, pharmaceutically acceptable vehicle comprised essentially of an intimate admixture of from about 1 to 10 parts of (I) a dry, non-lyophilized, stable, sterile 6-trifluoromethyl-3-benzyl-7-sulfamyl-3,4-dihydro-1,2,4-benzothiadiazine 1,1 - dioxide, about 30 to 50 parts of (II) mannitol and about 20 to 40 parts of (III) potassium carbonate.

6. A dry, non-lyophilized, stable, sterile composition comprising about 25 to 75 parts of 6-trifluoromethyl-7-sulfamyl-3,4-dihydro-1,2,4-benzothiadiazine 1,1-dioxide and about 200 to 300 parts of N-methylglucamine.

7. A dry, non-lyophilized, stable, sterile composition comprising 6-trifluoromethyl-7-sulfamyl-3,4-dihydro-1,2,4-benzothiadiazine 1,1-dioxide and as a substantially dry, water soluble, physiologically acceptable, moderately alkaline substance, N-methyl-glucamine.

References Cited

UNITED STATES PATENTS

| 2,809,194 | 10/1957 | Novello. |
| 2,886,566 | 5/1959 | Novello. |
| 2,910,474 | 10/1959 | Novello. |
| 2,983,730 | 5/1961 | Cragoe _____ 167—650 X |
| 2,451,772 | 10/1948 | Plungian. |

FOREIGN PATENTS

| 57,519 | 8/1960 | Australia. |

OTHER REFERENCES

Freis et al., Journal of American Medical Association, vol. 166(2), pp. 137–140, Jan. 11, 1958.

Ford, Southern Medical Journal, vol. 52, pp. 40–45, January 1959.

Merck Index, 6th Ed. 1952, p. 602 "Mannitol" (RS356-M529).

Baer et al. P.S.E.B.M. 100, 3 pp. 442–446 (Mar. 1959).

Pharmaceutical Journ. 181:4965, p. 498 (Dec. 27, 1958) by G. T. Nelson.

Ford, Am. J. Med. Sciences, 239:2, pp. 85–86 (February 1960).

Charnicki et al., J. A. Ph. A. 48 (11), pp. 656–659 (November 1959).

U.S. Dispensatory 25, 1955, p. 1097.

Merck Index, 7th Ed. 1960, pp. 678, 821, 1071 (pre 1960 refs. to the amines).

Martindale, "The Extra Pharacopoeia," 24 Ed., vol. 1, 1958, p. 1215, "Potash Effervescing Tablets."

ALBERT T. MEYERS, *Primary Examiner.*

J. D. GOLDBERG, *Assistant Examiner.*

U.S. Cl. X.R.

424—358, 366